Jan. 11, 1944.   J. D. WILHOIT ET AL   2,338,699
AIRPLANE LANDING GEAR
Filed Sept. 26, 1939   3 Sheets-Sheet 1
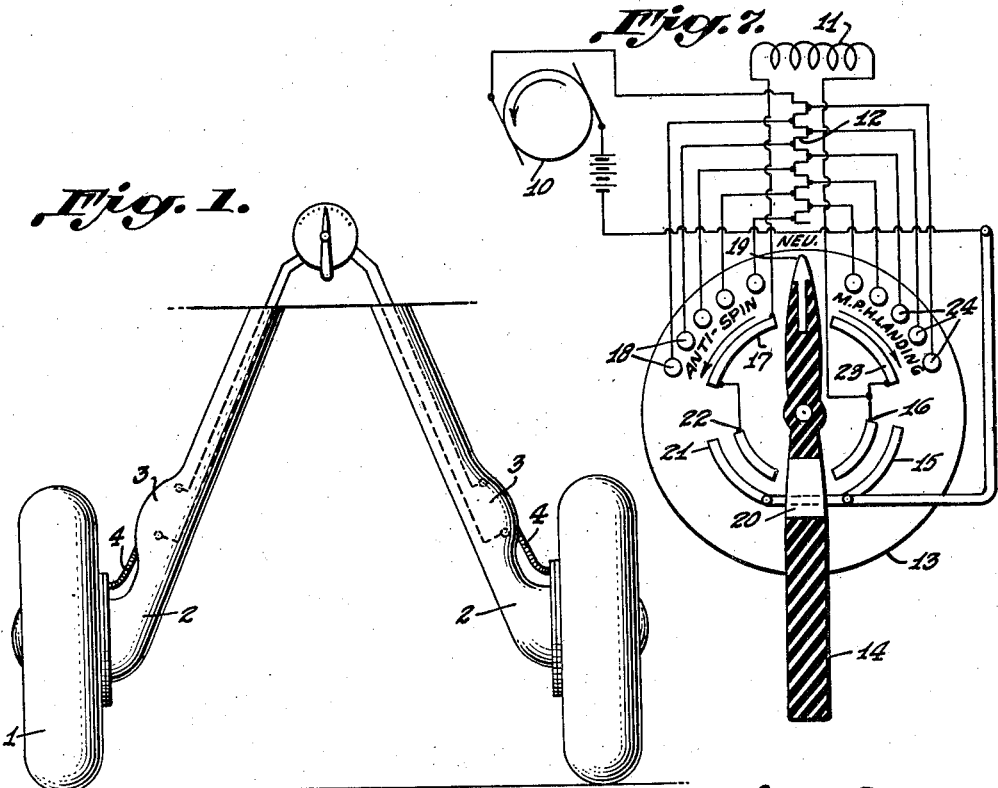
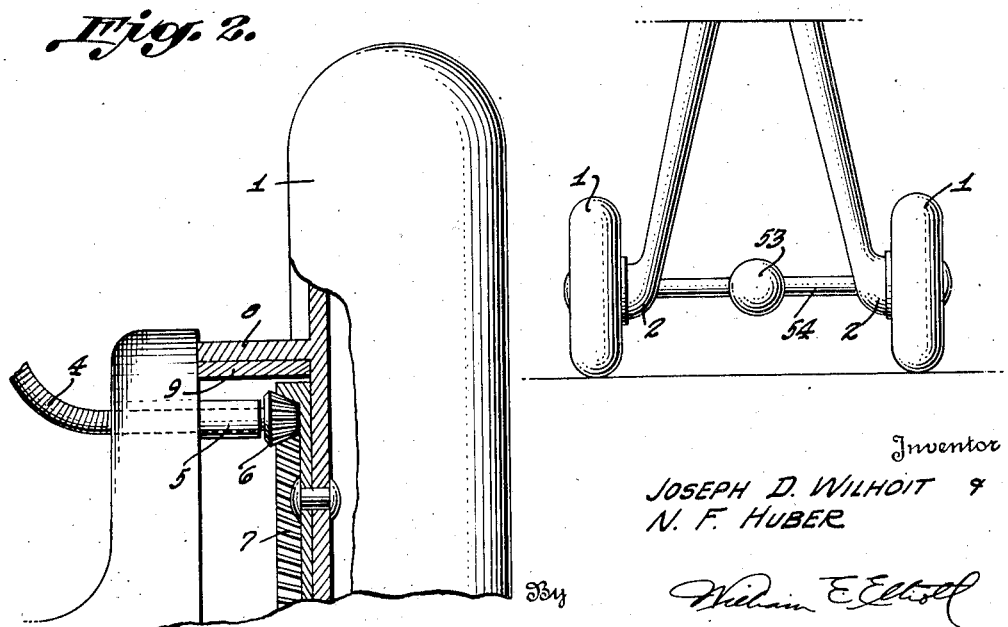
Inventor
JOSEPH D. WILHOIT &
N. F. HUBER
By
William E. Elliott
Attorney Jan. 11, 1944.   J. D. WILHOIT ET AL   2,338,699
AIRPLANE LANDING GEAR
Filed Sept. 26, 1939   3 Sheets-Sheet 2

Inventor
JOSEPH D. WILHOIT &
N. F. HUBER

Jan. 11, 1944. J. D. WILHOIT ET AL 2,338,699
AIRPLANE LANDING GEAR
Filed Sept. 26, 1939 3 Sheets-Sheet 3

Inventor
JOSEPH D. WILHOIT &
N. F. HUBER
By William E. Elliott
Attorney

Patented Jan. 11, 1944

2,338,699

UNITED STATES PATENT OFFICE 2,338,699

AIRPLANE LANDING GEAR

Joseph D. Wilhoit, Chicago, Ill., and Nace F. Huber, Louisville, Ky.

Application September 26, 1939, Serial No. 296,660

8 Claims. (Cl. 244—79)

This invention relates to aircraft, and particularly to heavier-than-air craft having landing wheels for supporting the weight of the airplane when taking off and upon landing.

The two principal objects of this invention might be stated as follows: first, to provide a novel control means for rotating the wheels of conventional airplane landing gears in flight for restoring control to the pilot of an airplane in a spin, and second, to provide in such a control, means for rotating the wheels of an airplane upon landing to reduce the frictional wear thereon when striking the surface of the ground or runway. Another object of the invention is to provide a novel method of operating the landing gear of an airplane whereby control is restored to the pilot when the airplane is in either an ordinary spin or in a flat spin. Another object is to provide a novel drive for the wheels of an airplane whereby rotation at any desired speed may be effected in either forward or reverse direction. Another object is the provision of apparatus for utilizing the gyrostatic effects of rotating airplane wheels for stabilizing the flight of such planes and for aiding recovery from spins. Another object of the invention is the provision of apparatus for varying the gyrostatic effect required to restore stability to the airplane in different stages of spins. A still further object is the provision of means for producing circulatory air currents for overcoming the dead air space surrounding a plane in a spin. Further objects will be apparent from the following description.

It is well known to pilots and aeronautical engineers as well as to others skilled in the art that among the greatest hazards of present day flying is that of the spin and particularly the advanced stage thereof known as the flat spin. Because of the present improved aerodynamic design of planes of moderate size as well as that of the larger monoplane transports and "clipper" ships, the previous hazards of nose and tail spins have been largely eliminated but due to the raising of the center of gravity on the new low-wing types and the shifting of this center backward, the tendency toward ordinary spiral spins and also flat spins may be regarded as having been increased. The result of this situation is that pilots skilled in the operation of older planes are led by the increased power, ease of control, and apparently increased airworthiness of the newer airplanes into situations in which a spin is inevitable. The increased weight of the newer planes without a proportionate increase in the area of lifting surface has increased the stress per unit area beyond the strength of materials now available. Thus it is that pilots attempting to extricate themselves from a spin attain diving speeds sufficient to tear away the wing surfaces from the fuselage upon a sudden leveling off necessitated by low altitude. It is the purpose of this invention to enable the pilot to regain control of his plane in a spin as the direct and immediate result of initiating operation of our improved stabilizing device.

The theory of the spin and sequence of maneuvers leading up to it are well known. The spin may be voluntary or involuntary although it is with involuntary or inadvertent spins that our invention should find its greatest usefulness. In a voluntary spin, the pilot sets the plane into a climb and cuts down the throttle to the stall position. As stalling speed is approached, the angle of attack is increased beyond the stall and the lateral equilibrium of the plane is disturbed by movement of the aileron or the rudder. The plane then noses sharply over on one or the other wing tip and begins a steep spiral descent about a cylinder having a radius equal to a value from one-half to twice the span of the plane with the wing tip nearest the axis of spin tilted downwardly. As the plane goes from turn into turn in the spin, its speed increases and the radius of spin approaches closer to the spin axis. As these advanced stages of the spin are reached the chance of the pilot's regaining control become less and less and a crash not infrequently ensues.

The inadvertent is caused by the same factors as the voluntary spin but finds the pilot usually unprepared with the result that several turns have been made with ever increasing velocity before he undertakes to regain control. The first impulse of the novice at this stage is to attempt to level off the plane by raising the lowered wing tip. In accomplishing this, the plane's speed is checked, the controls become even more "dead," the vertical descent is accelerated and the extremely dangerous flat spin stage is reached from which it is well nigh impossible to regain control of the airplane.

Regaining control of a properly designed plane in the early stages of a spin, say after one or two turns have been made is not difficult for a skilled pilot when sufficient altitude has been attained before the beginning of the spin. In fact, one of the final tests required of a candidate before the granting of a pilot's license is demonstrated ability to regain control after entering a voluntary spin. Recovery is accomplished by reducing the mean angle of attack below the maximum lift angle, operating the control surfaces to turn the lowered wing tip sharply lower with full power on to send the plane into a steep dive. As flying speed is reached in the dive, the pilot can level off slowly into full control of the plane again. The above course presupposes sufficient altitude so that the leveling off can be done before the plane has reached the ground in its dive.

The risk of inadvertent spins is particularly great near the ground just after taking off. Here a mistake in judgment in attempting too steep a climb or even a normal climbing angle in the case of improper weight distribution toward the tail of the ship will cause the same to stall and then veer away into the spin. Most well designed planes have their center of gravity far enough forward so that the nose of the ship will drop as the stall is approached and the ordinary spin begins. However, in planes having their center of gravity too far backward as well as those of the former type which have been loaded incorrectly, the spin may be almost from the first of the flat type with consequent difficulty in emergence. Since it is always necessary to dive to regain flying speed and hence control, it will readily be seen that the flat spin with its attendant "dead" controls and sickening "roll" makes the dive from such a position extremely difficult of attainment. The tragic results of these situations figure largely in the list of causes of present day accidents in aviation.

A consideration of the forces acting on an airplane in a spin will assist in an understanding of the principles underlying our invention. As the plane spirals downwardly about a vertical axis with the wing tip nearest the axis inclined sharply downward and the angle of attack in the neighborhood of 70 degrees, there are two principal couples acting on the aerodynamic surfaces to maintain the spin. The force of gravity may be disregarded since it is balanced by the drag. One couple having principal components in parallel horizontal planes acts on the wing surfaces and particularly toward the opposite ends of these surfaces to keep the course of the plane in its circular, spiral path. The other couple having principal vertical components acts on the same surfaces to keep the inner wing tip lower than the outer wing tip. Due to these couples, the controls of the plane are "dead" in all positions, and the sensation experienced by pilots is that of utter helplessness in a situation in which all normal flight technique is unavailing. As has been pointed out above, the recourse to the dive as speedily as possible is the sole method to be followed in coming out of a spin. Our invention is directed to the employment of agencies to facilitate an early realization of such dive procedure since it is acknowledged that the earlier the dive is commenced, the more easily the plane comes out of the spin, the more quickly leveling off may be accomplished and the less altitude is required for its safe completion.

Referring now to the drawings:

Fig. 1 is a diagrammatic representation of a conventional airplane landing gear modified according to our invention.

Fig. 2 is a view partly broken away showing the gear drive means of Fig. 1.

Fig. 6 is a front elevation of still another physical embodiment of our invention.

Fig. 7 is a view showing a control circuit for one of the electric motors for rotating the landing wheels.

Fig. 8 is a front elevation view of a tricycle landing gear equipped with our invention, while

Figure 3:
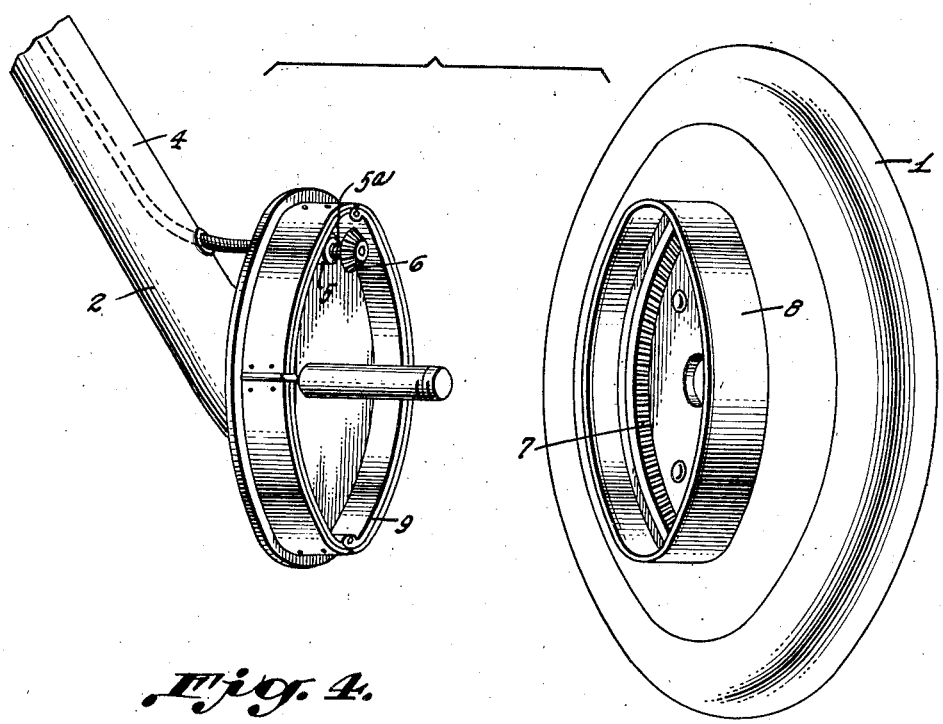
Fig. 3 is a detail perspective view of a modified form of our invention.

In as much as our invention depends chiefly on gyrostatic effects for its action in producing forces for stabilizing airplanes when in ordinary or in flat spins, a statement of the general law of gyroscopes will aid an understanding of the underlying theory invloved. When a gyroscope is subjected to a couple or force about an axis at right angles to its axis of rotation it resists that couple, and the degree of resistance is proportional to the velocity with which the gyro turns or precesses about a third axis which is called the axis of precession. The resistance continues until the gyro has precessed so that its plane of rotation coincides with the plane of the applied couple. In utilizing the principle of the gyroscope, the force of precession is exerted directly on the plane to counteract the forces acting to maintain the spin.

In brief, therefore, our invention proposes the use of moments resulting from the rotation of the landing wheels of an airplane in a spin to change the resultant of forces acting on the plane and thus put the airplane in a dive from which leveling off and control by the pilot may be quickly regained. This change is effected by rotating the landing wheels in a direction opposite to their direction of rotation upon landing to produce a moment about the outer wing tip of the spinning plane directed away from the axis of spin which balances or overcomes the moment about the inner wing tip which is acting to keep the plane in its spiral movement about the spin axis. Thus, the plane is urged to move in a direction tangential to its former circle of spin. The rotation of the wheels produces a second moment acting vertically about the outer wing tip and hence 90 degrees from the first moment noted above. This moment is directed downwardly and its effect is to lower the inner wing tip still more. The net effect of these forces with the rudder in neutral position and the elevators set for a dive is to quickly initiate the latter maneuver. Thus, by rapidly rotating the normal landing wheels of the plane, the ship leaves the spin almost as soon as it enters it provided the controls are set as stated. The dive resulting from the quick application of this corrective factor is made at low speed and hence may be leveled off without great loss of altitude. Thus, spins which have heretofore been fatal due to low altitude are quickly emerged from in what appears to be a single planned maneuver with little loss of altitude. It should be stated that the gyrostatic forces produced by the rotating wheels are correct in direction to overcome the inherent couples of the spin only when their rotation is in a direction opposite to that in which they are rotated upon landing contact with the ground. Thus, in the case of a clockwise spin viewed from above, the wheels would be rotating counterclockwise when viewed horizontally from the axis of spin. Added to the moments acting directly on the plane as described above are the forces attributed to air currents set in motion by the wheel rotation. Attention is now invited to Figs. 1 and 2 in which a more or less conventional landing gear comprising wheels 1 rotatably mounted on struts 2 are arranged to be driven in either direction by means of electric motors diagrammatically indicated at 3 through flexible Bowden cables 4, pinion 6 and ring gear 7 secured to the inner face of the wheel hub.

In Fig. 7 is shown a control circuit for a D. C. series motor which may be employed to drive one of the wheels 1. Other types of motors may be used if desired such as shunt, compound, etc., but in each case it will be desirable for each motor of the pair to be of the same type and to have the same operating characteristics. In the circuit illustrated the motor armature 10 having the usual series field 11 is connected to the variable resistance switch indicated at 13. The resistance is shown at 12 and upon movement of control lever 14 to the left or to the right, the current from the battery source will flow through bridge member 20, contacts 15 and 16, through the field winding 11 in one direction and thence through contact 17, the apex bridge member of lever 14, contact 18 to resistance 12 to rotate the motor in the direction to counteract the forces of the spin. When the lever 14 is rotated in the other direction, the circuit will include bridge member 20, contacts 21 and 22, the apex bridge member and contacts 23 and 24, through the resistance 11 and through the field winding 11 in the opposite direction as is well known in motors of this type. A legend indicating the rotation of the wheels in the required direction for anti-spin or landing speed may be calibrated to give the R. P. M. at any position of the lever 14. It is obvious that by connecting two such switches together for parallel operation the control of both wheels will be simultaneous by the single control lever.

In Fig. 3 is shown a modified arrangement in which wheel 1 carried by strut 2 and having brake drum 8 provided with ring gear 7 rotated by pinion 6 from spring clutch 5a connected to flexible Bowden cable 4. The spring clutch 5a is to compensate for starting inertia of the wheels and is of the type for transmitting equal torque in both directions. Bearing 5 serves as a mounting for the lower end of cable 4 and its connection with spring clutch 5a.

The upper end of the cable 4 is connected to the shaft of an electric motor (not shown) within the fuselage of the plane. A single motor may drive both wheels by connecting a cable end to each end of the motor shaft. In this view reference numeral 9 indicates the usual brake shoe for coaction with the brake drum 8.

Figure 4:
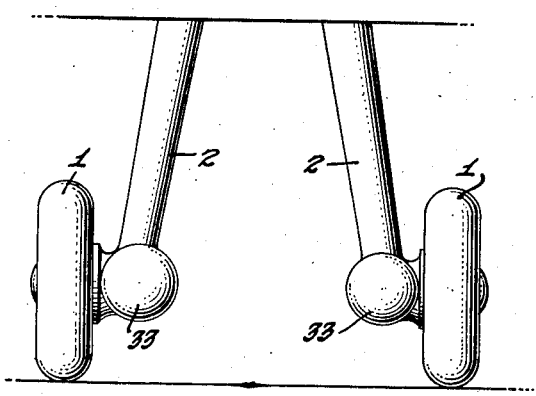
Fig. 4 is a front elevation of another form of our invention.

In Fig. 4 a driving motor for each wheel 1 is directly connected to the wheel shaft and is covered by a streamlined housing 33 which flows into the strut 2. Strut 2 may enclose the usual direct acting shock absorber adjusted for the additional weight of the electric motor. It will be noted that in this form of the invention the gyrostatic effect of the driving motor adds directly to that of the associated wheel.

Figure 5:
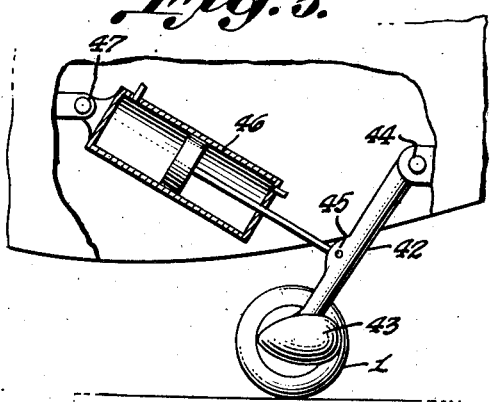
Fig. 5 is a side elevation partly cut away of a conventional retractable landing gear which is provided with our improvement.

In Fig. 5 is shown an arrangement similar to that of Fig. 4 but in which the landing gear is of the retractable type. Here the wheel 1 is directly driven by a motor enclosed in the streamlined casing 43 carried by strut 42 pivoted at 44 and retractable into the fuselage of the plane by means of the piston and containing cylinder 46 linked at 47 to the fuselage and at 45 to the strut 42. The piston will be actuated by air pressure admitted to the proper end of the cylinder as will readily be understood.

Fig. 6 illustrates a modification of our invention in which a single driving motor enclosed within the streamlined housing 53 is directly connected at each end to one of the wheels 1 through a shaft (not shown) which is enclosed in tubular member 54, the shaft being journaled in the housing formed by the lower end of strut 2. In this case as in that of Figs. 4 and 5, the motor shaft is a continuation of the wheel shaft so that the gyrostatic effects are directly additive.

Figure 8:
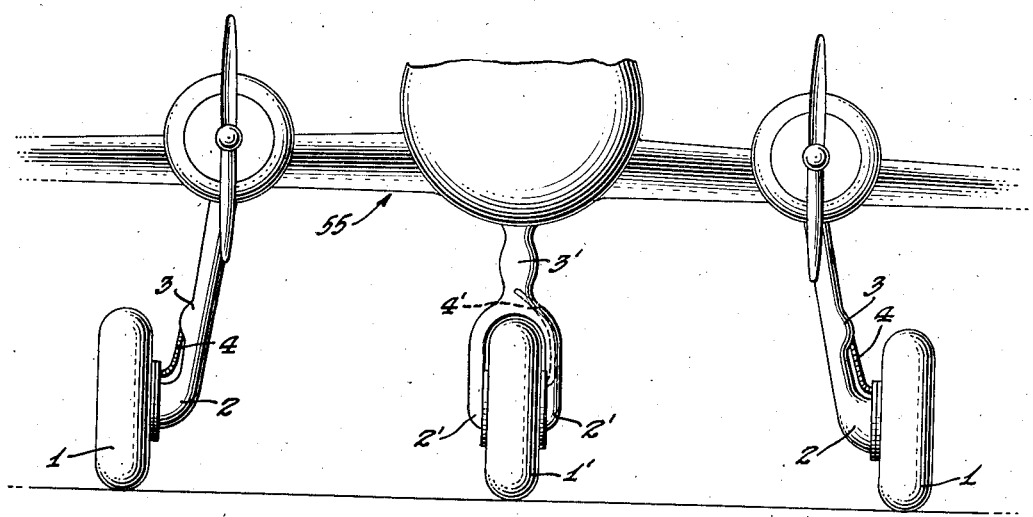
Figure 9:
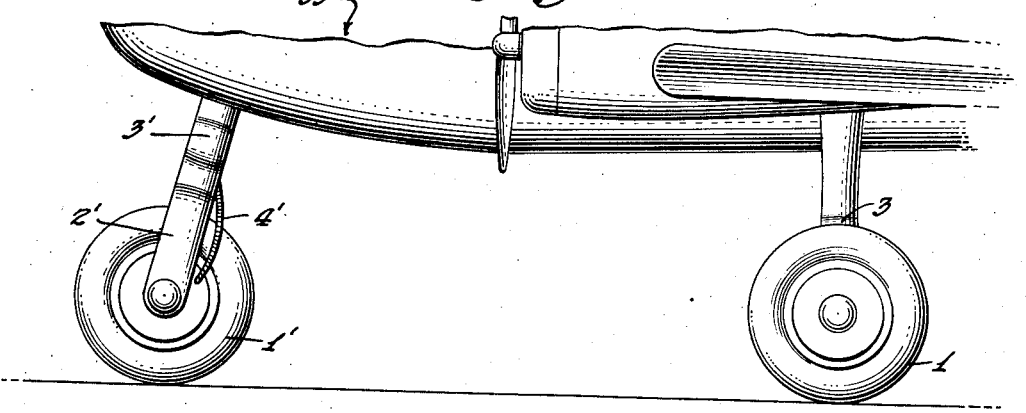
Fig. 9 is a side elevation view of Fig. 8.

Fig. 8 shows the application of our invention to one of the new tricycle landing gears used on some of the recent large transport planes. In Fig. 8 and Fig. 9 it will be noted that the wheel drive arrangement of Fig. 1 is herein exemplified. In these figures, the outer wheels 1 carried by struts 2 are rotated by Bowden cables 4 driven by electric motors 3. The fuselage 55 carries the forward strut 3' the bifurcated arms 2' of which support the wheel 1' for rotation by means of Bowden cable 4'. The struts 2 and 3' are shown as of the non-retractable type but the more usual retractable type in which the strut is folded upon itself to withdraw the wheel into the wing or fuselage is obviously within the scope of our invention. It will be obvious also that the individual wheel drive means of Fig. 4 or of Fig. 5 may be utilized to drive the tricycle landing gear of Figs. 8 and 9. A control switch for the motors 3 and 3' having three switch arms linked together for simultaneous operation to insure the same speed of rotation for all wheels or individual control switches may be provided permitting rotation of the wheels in opposite directions thereby producing various combinations of gyrostatic moments. Thus, the pilot may rotate the various wheels in such directions and at such speeds as experience has demonstrated is necessary to produce the required corrective force.

In the foregoing illustrative examples of our invention it will be understood that the design of motors 10 (Fig. 7) and resistances 12 will be such as to give a high speed of rotation in the anti-spin direction and suitable speed variation for landing within the normal landing speed range of the particular plane. Of course, the provision of a short circuiting resistance for the field of the motor to be effective in the neutral position of the lever 14, as well as other obvious changes such as the substitution of a shunt or compound wound motor for the series motor shown are within the scope of our invention and would be apparent to one skilled in the art. Therefore, we do not wish to limit this grant to the precise combinations disclosed, nor to be restricted to the utilization of the standard landing wheels of planes now in use since in particular cases it may be found desirable to increase the size, weight and/or proportions of the wheels and usual pneumatic tires carried thereby.

What is claimed is as follows:

1. In aircraft the method of stabilizing flight from a spin consisting in rotating the landing wheels of the airplane in a direction opposite to their normal direction of rotation in landing while maintaining the plane of rotation of each wheel unchanged with respect to said airplane.

2. In aircraft the method of overcoming a downwardly spiralling unstable maneuver which consists in rotating the landing wheels of the airplane in a direction opposite to their normal rotation upon landing to produce a rotative torque about the inner wing tip in an outward substantially horizontal direction and a similar torque but directed substantially vertically downward to send the craft into a dive from which levelling off and return of normal control to the pilot will be made.

3. In aircraft provided with retractible landing gear the method of aiding recovery from a spin comprising the steps of moving the landing gear including the wheels thereof from a retracted position to an extended position and simultaneously rotating the wheels in a direction opposite to their direction of rotation upon landing while maintaining the plane of rotation of each wheel unchanged with respect to said airplane.

4. In aircraft provided with retractible landing gear the method of aiding recovery from a spin comprising the steps of moving the landing gear including the wheels thereof from a retracted position to an extended position and simultaneously accelerating said wheels in a direction opposite to their direction of rotation upon landing while maintaining the plane of rotation of each wheel unchanged with respect to said airplane.

5. In aircraft provided with a tricycle landing gear the method of overcoming a downwardly spiralling unstable maneuver which consists in rotating the landing wheels of the airplane in a direction opposite to their normal rotation upon landing while maintaining the plane of rotation of each wheel unchanged with respect to said airplane to produce a rotative torque about the inner wing tip in an outward substantially horizontal direction and a similar torque but directed substantially vertically downward to send the airplane into a dive from which levelling off and return of normal control to the pilot will be made.

6. In aircraft provided with a tricycle landing gear the method of stabilizing such airplane in flight comprising the steps of rotating certain of said landing wheels in one direction and at the same time rotating the remaining wheels in the opposite direction.

7. In an airplane provided with a pair of downwardly extending struts, a pair of landing wheels having brake drums cooperating with internally expanding brake shoes carried by said struts, the combination of means carried by the plane for rotating said wheels at the same speed either forwardly or backwardly and for varying said speed as desired, comprising an electric motor housed within each of said struts, a ring gear formed on the inside of said brake drum near the periphery thereof, a pinion carried by the lower end of said strut in driving relation with said ring gear, a flexible driving connection between said pinion and said motor, a source of electrical energy and a control means for varying the speed of said motors simultaneously as desired.

8. The combination recited in claim 7 in which the flexible driving connection includes a spring clutch for reducing starting inertia strain on the driving elements.

JOSEPH D. WILHOIT.
NACE F. HUBER.